June 17, 1969  A. W. DAVIS ET AL  3,450,102
AUTOMATIC POULTRY DRINKER
Filed July 17, 1967  Sheet 1 of 3

INVENTORS
Albert W. Davis
Burton P. Franklin
BY
ATTORNEYS

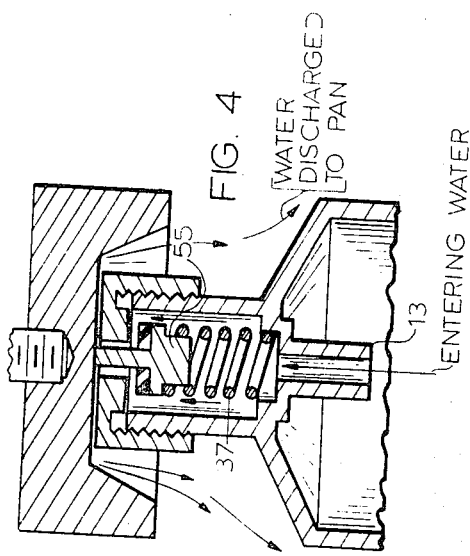
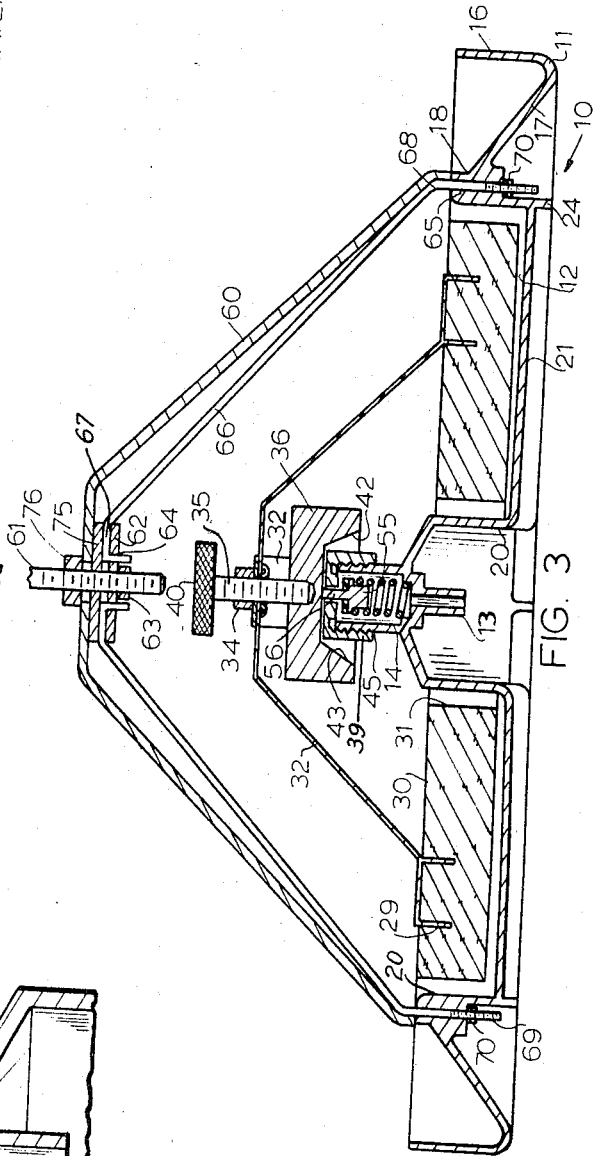
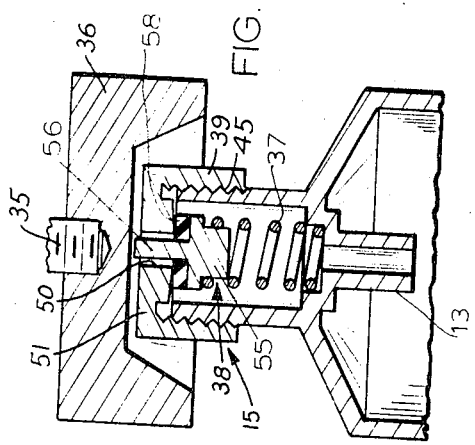

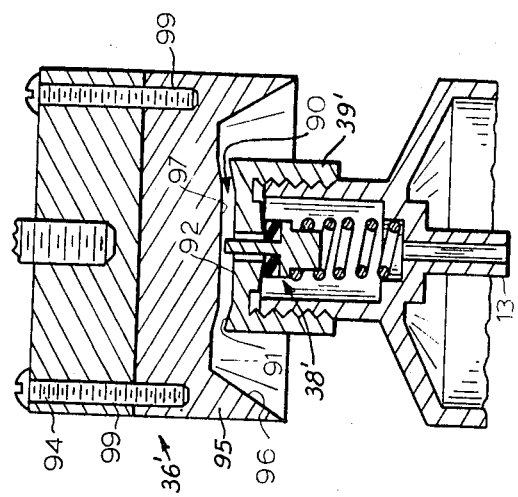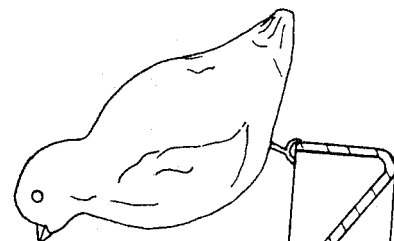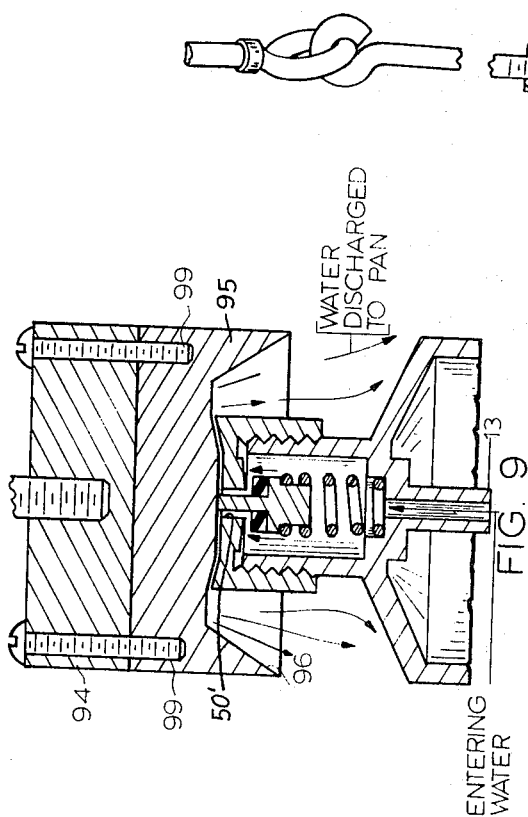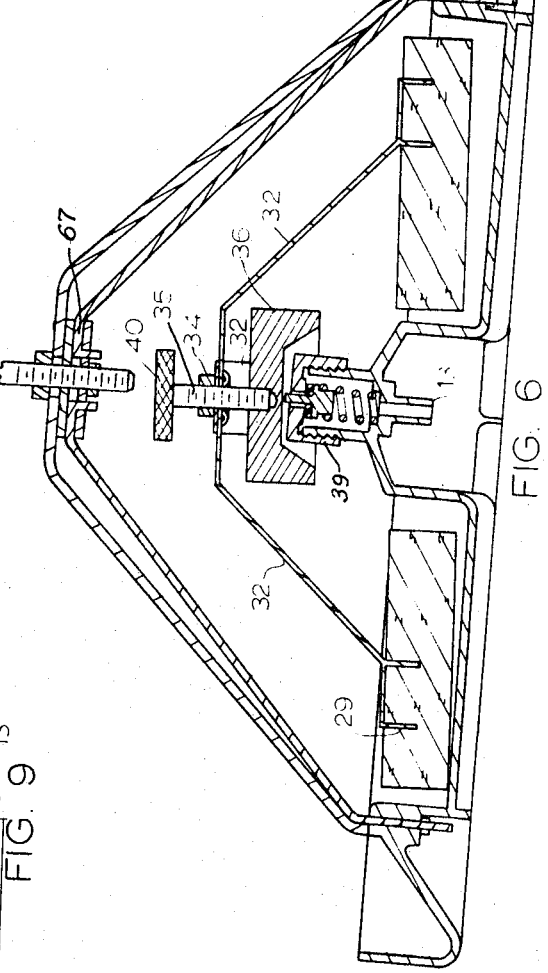

3,450,102
AUTOMATIC POULTRY DRINKER
Albert W. Davis, Bonlee, N.C., and Burton P. Franklin, Danville, Va., assignors, by mesne assignments, to Poly-Matic Fountain, Inc., Siler City, N.C., a corporation of North Carolina
Filed July 17, 1967, Ser. No. 653,757
Int. Cl. A01k 7/02, 39/62
U.S. Cl. 119—80                                15 Claims

ABSTRACT OF THE DISCLOSURE

A poultry drinker utilizes a float and a water inlet valve which is controlled by the float to maintain a desired water level in a drinking trench. Both the float and the valve are loaded by a common adjustable weight member. Adjustment of the weight position adjusts the water level. The valve automatically closes in the event the drinker is tilted irrespective of the water level but remains operable over a substantially wide range of inlet water pressures so long as the drinker remains substantially level.

BACKGROUND OF THE INVENTION

Field of the invention

The present invention relates generally to the supplying of water to poultry or like animals and, more particularly, to the intermittent and automatic provision of fresh water to chickens as they grow from small chicks to large sized birds.

Description of prior art

In order to raise poultry on a commercial scale, various production techniques must be followed in the feeding, watering and general care of the fowl. It is quite common in the raising of broilers, for example, to have buildings which house 10,000 birds and upward. The birds are brought into the house when a day old and remain together throughout their growing period which may range from 8 to 12 weeks of age. In the raising of poultry on such a large scale and on the "all-in all-out" method, it is necessary to minimize manual labor and to this end, automatic feeding and watering devices are now widely employed. The automatic watering devices of the prior art are generally comprised of a complex spring-valve mechanism which may or may not include a float. While valve arrangements of this type are satisfactory for some uses, they inherently have the disadvantages of being too costly, being dependent on a particular water pressure, overflowing when placed on uneven surfaces or when tilted if suspended, being difficult to clean, being practically impossible to dismantle and to be reassembled in a relatively short period of time for repair purposes and being adapted to service chicken or fowl of only one size.

A representative prior art patent is No. 3,079,892 to Lowery which teaches the combination of a float and a pivot arm which seals the water inlet upon the upward movement of the pivot arm. This apparatus is encased in a bell-shaped structure and has an outlet which leads to a circular trough area. While the valve mechanism therein is relatively simple, it is gauged to handle only a pressure of a particular force and if the pressure is changed, the water in the inlet forces the float downwardly and allows the water to escape outside of the trough area and onto the floor. Further, if the trough is initially placed on an uneven surface which is most likely to be the rule and not the exception, the float will have a tendency either to be below its normal cutoff position thus allowing excess water to run into the trough area and spill onto the floor or to seat too firmly against the water inlet and prevent any water from entering the system. Also, the level of water in the trough cannot be varied due to the static positioning of the pivot member and water inlet in the housing. This patent is typical of what may be found in the art for it solves some of the problems with which the art is faced while leaving open other problems. Other prior art references may solve problems not solved by Lowery but may have disadvantages not inherent in the Lowery structure.

SUMMARY OF THE INVENTION

The apparatus of this invention is primarily comprised of a trough, a float and a valve. The trough is generally circular in nature and is provided with a peripheral substantially narrow, annular, drinking trench and an interior substantially wide, annular float receptacle both of which are adapted to receive and retain water with the drinking trench receiving its water from the float receptacle. The float which is substantially annular or ring-like is buoyed in the float receptacle by means of the water and is provided with a plurality of upwardly extending and intersecting float supports to which the float is connected. The float supports in their upper intersection receive and support a threaded and vertically arranged adjusting bolt which in turn is threadably received by and supports a weight. The valve is axially aligned with respect to the bolt and weight structure and includes a valve chamber residing above the trench and float receptacle, an inlet which connects the water source with the valve chamber, and a plunger. The plunger is provided with a valve seat and extends from the valve chamber through an opening so as to contact the weight. The weight also loads the plunger and tends to force the plunger downwardly and provide an opening for water to flow from the valve chamber to the float receptacle and then to the trench. Further, the weight in conjunction with its mating portion of the valve chamber may be designed so that upon the substantial tilting of the trough, the weight due to its unique design disengages the plunger while remaining in contact with portions of the valve chamber to allow the plunger to shut off the flow of water from the valve. The plunger may be supported in the valve chamber by a spring as in the illustrated embodiment or may be directly connected to the weight. The height of the water in the trench may be lowered or raised by turning the adjusting bolt in the desired direction to create greater or less distance required to effect seating of the valve from an open position.

It is contemplated and desirable that the trough, valve and float be at least partially enclosed by a cover. The cover is secured to the trough so as to allow the trough to be supported above the floor or ground area whereby the composite drinker may be raised or lowered in relation therewith in order to adjust the height of the drinking trench to the particular size chicken.

Therefore, an object of this invention is to provide an improved float operated valve means for automatically maintaining the proper level of water in a poultry drinker trench.

Another object of this invention is to provide a composite drinker which is easily dismantled so that worn parts may be replaced and so that the composite unit may be assembled in a minimum of time.

A further object of this invention is to provide a position sensitive valve which prevents water from overflowing the drinking trough when the unit is placed on an uneven surface and which is adapted to supply water to the drinking trench at various levels depending on the particular need.

A still further object of this invention is to provide a composite drinker with a position sensitive valve that is operable under water pressures ranging from a few feet of water such as might be obtained from a tank to a higher pressure such as the typical forty pounds per square inch pressure obtained in pressure water systems.

Yet another object of this invention is to provide a drinker for poultry which maintains a sanitary environment by preventing spillage and overflow of water.

These and other objects of this invention will become apparent when the following claims and detailed description are read in conjunction with the appended drawings, and which:

DESCRIPTION OF THE DRAWINGS

FIGURE 1 is a pictorial view of the composite drinker showing the same being mounted on the floor of a chicken house or the like;

FIGURE 3 is a section view taken along lines 3—3 of FIGURE 1 showing the various elements of the valve mechanism, the float mechanism and the trough in a normal level position;

FIGURE 4 is an enlarged fragmentary section view of the valve mechanism in the open position;

FIGURE 5 is an enlarged fragmentary section view of the valve mechanism in a closed position;

FIGURE 6 is a section view like FIGURE 3 showing the drinker supported from above and showing the valve closed with a chicken perched on the drinker so as to slightly tilt the same;

FIGURE 8 is an enlarged fragmentary section view of an alternative valve mechanism showing the valve mechanism in a closed position;

FIGURE 9 is an enlarged fragmentary section view of the alternative valve mechanism showing the valve mechanism in an open position;

DETAILED DESCRIPTION OF THE PREFERRED EMBODIMENTS

Figure 11:
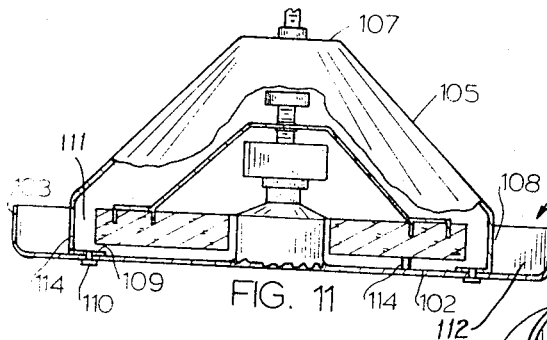
FIGURE 11 is a sectional view of an alternate embodiment of the trough and cover showing the cover being fastened directly to the bottom of the trough.
Figure 1:
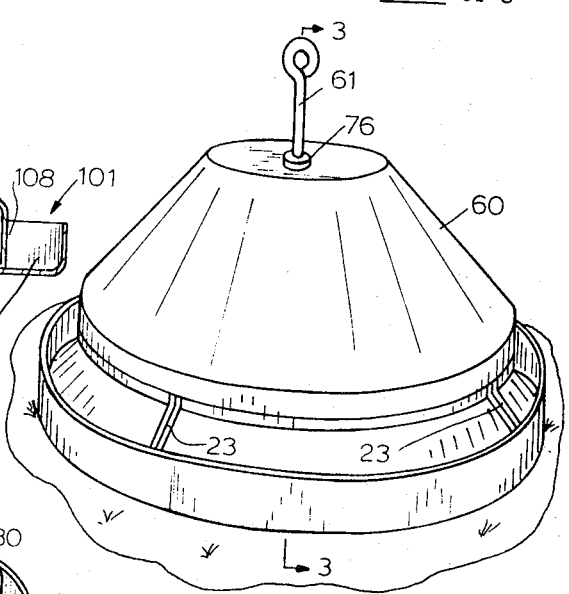
Figure 2:
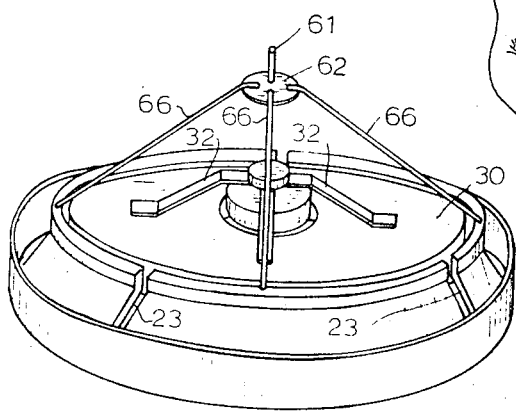
FIGURE 2 is a pictorial view of the drinker with the cover removed and showing the float and valve mechanism.
Figure 7:
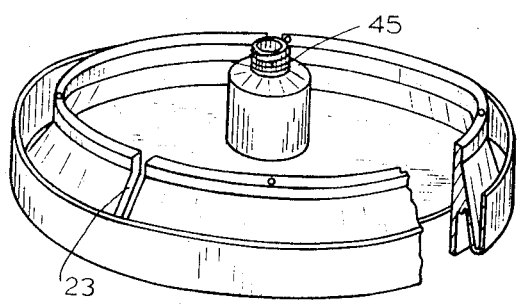
FIGURE 7 is a pictorial view of the drinker with the cover and float assembly removed showing the passageways for channeling the water into the drinking trench.

Trough 10 is substantially circular in nature and includes a substantially narrow, annular drinking trench 11, a substantially wide, annular float receptacle 12, a water inlet 13 and valve chamber 14 of valve 15. Drinking trench 11 is formed by annular vertical wall 16, sloping wall 17 and connecting wall 18. Float receptacle 12 is comprised of inner vertical wall 20, bottom wall 21 and connecting wall 18 thus making it integral with drinking trench 11. Drinking trench 11 and float receptacle 12 are connected by passageways 23 so that the same level of water which resides in float receptacle 12 will also reside in drinking trench 11. When the composite drinker resides on a floor or ground surface, it is supported by drinking trench 11 at the intersection of vertical wall 16 and sloping wall 17 and by extension 24 of connecting wall 18.

Float 30, which is essentially annular or doughnut shaped and which has an opening 31 therein, is made from some lighter-than-water object, such as foamed polystyrene, wood or the like. Float 30 is buoyed in float receptacle 12 of trough 10 by the water received therein and is provided with a plurality of upwardly extending and intersecting float supports 32 which are suitably secured by prongs 29 or the like to float 30 and which extend from one side of float 30, across opening 31 to the other side of float 30. Float supports 32 are secured at this upper intersection to a collar 34 which extends vertically above and below the plane of intersection. Collar 34 is internally threaded and threadably receives an adjusting bolt 35.

The composite valve structure 15 includes adjusting bolt 35, weight 36, valve chamber 14, spring 37, plunger 38 and chamber cap 39. Adjusting bolt 35, which has a knurled head 40 to facilitate the turning thereof, is threadably received by threaded collar 34 as it extends downwardly and is rigidly secured to weight 36. As shown in FIGURE 3, adjusting bolt 35 is threadably received by weight 36; however, adjusting bolt 35 is tightened therein so that upon the turning of bolt 35, weight 36 turns therewith. Weight 36 is circular in nature and is provided with an inverted frusto-conical cavity 42 which forms a flat interior surface 43. Valve chamber 14 is cylinder-like in shape having a smooth inner surface which receives pressurized water from water inlet 13 and a threaded outer surface 45 which threadably receives cap 39. Cap 39 has a circular opening 50 in top wall 51. Plunger 38 includes a body portion 55 and an integral shaft 56 which has a diameter slightly smaller than the diameter of opening 50 of cap 39. Shaft 56 is adapted to receive a washer-like seat 58 which aids in the shutting off of the water through opening 50 when plunger 38 is in a closed position. It is to be noted that shaft 56 is made slightly longer, about ⅝₄″ being preferred, than the length of opening 50 so that upon the downward movement of weight 36 interior surface 43 of weight 36 engages shaft 56 and pushes plunger 38 downwardly against spring 37 so as to provide an outlet for the water residing in valve chamber 14.

Figure 10:
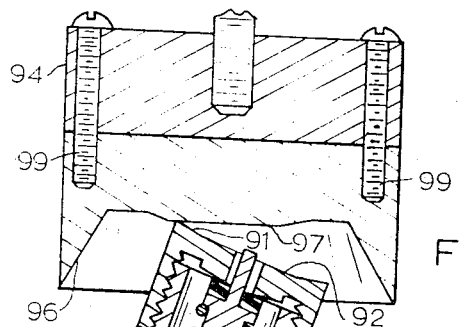
FIGURE 10 is an enlarged fragmentary section view of the alternative valve mechanism showing the valve mechanism in a closed position and tilted to an angle of 20° with respect to the weight and float arrangement.

In reference to FIGURES 8, 9 and 10 which disclose an alternate design for the cap and weight, cap 39' is identical to cap 39 with the exception of its upper surface 90. Upper surface 90 has the shape of a recessed frustum and includes sloping side wall 91 and flat surface 92. Opening 50' is axially aligned with the frustum. Weight 36' includes an upper segment 94 which is generally comprised of steel or some other heavy metal and a lower segment 95 which may be made from polytetrafluoroethylene, polyethylene, nylon or some compound presenting a relatively slick surface. Upper segment 94 is secured to lower segment 95 by screws 99 or the like thereby providing weight 36' with a high center of gravity which aids weight 36' in slipping out of contact with plunger 38'. The surface of lower segment 95 engaging cap 39' is indented to present a frustum cavity 96 with the inner surface being raised to form a mound 97. Mount 97 normally resides in the frustum of cap 39' and is adapted to engage plunger 38' when the water in the drinking trench is below the desired level. In reference to FIGURE 10, upon the tilting of the drinking trench relative weight 36' to an angle for example of 20°, mound 97 of lower segment 95 slips out of contact with plunger 38' to allow it to seal opening 50'. Upon the righting of the drinking trench, mound 97 will again engage plunger 38' to force it downwardly and to allow the drinking trench to be filled with the desired amount of water. Thus, water is prevented from entering the composite drinker when it is placed unevenly on a floor surface or when a chicken perches on it when suspended from the ceiling. Also, the drinking trench should be sufficiently deep to allow the water therein to buoy float 30 upwardly to the extent that mound 97 is raised out of contact with plunger 38' upon tilting.

A conical shaped cover 60 is provided for the composite drinker and is adapted to reside on connecting walls 18 so as to shield the water in float receptacle 12, the float 30 and other interior apparatus from being contaminated by the chicken, thus facilitating the cleaning of the entire apparatus. Where the composite drinker is suspended from the ceiling or the like, a connecting rod 61 extends axially through cover 60 to receive bearing plate 62 and nut 63 which supports bearing plate 62 thereon. Bearing plate 62 is provided with a plurality of holes 64. Also, connecting wall 18 includes a plurality of vertically extending openings 65 therein and in combination with holes 64 receive suspension rods 66. Each suspension rod 66 has a hooked shaped end 67 which is adapted to extend through a selected hole 64 and a flared V-shaped end 68, the short leg of which is threaded at 69 and extends through opening 65 in connecting wall 18. Nuts 70 are mounted on the ends 69 of suspension rods 66 to maintain the legs 68 in position. The various suspension rods 66 and cover 60 are maintained in a fixed relationship by means of a further plate 75 and nut 76. As nut 76 is tightened against cover 60, plate 75 is forced against the hooked ends 67 and "sandwiches" the same between itself and bearing plate 62 with bearing plate 62 being vertically secured by means of nut 63.

In reference to FIGURE 11 which shows an alternative design for the trough and cover, trough 101 includes a bottom wall 102 and a vertically arranged exterior wall 103. Cover 105 is comprised of axially aligned and integrally connected frustum 107 and cylinder 108 with the exposed edge of cylinder 108 having a flange 109. Flange 109 is secured to bottom wall 102 by any convenient means such as bolts 110. Cylinder 108 is provided with the appropriate openings 114 to allow water to flow from float receptacle 111 which is formed by cylinder 108 and bottom wall 102 to drinking trough 112 which is formed by cylinder 108, bottom wall 102 and exterior wall 103. Thus, the cover and the bottom wall of the receptacle combine to define an exterior drinking trench and an interior water reservoir either by the cover member extending down completely to the receptacle bottom wall or by providing the receptacle bottom wall with an upwardly extending interior wall which receives the cover member.

In operation, float receptacle 12 is initially empty of water thus allowing weight 36 to push shaft 56 of plunger 38 downwardly against the upward force exerted thereon by spring 37 so that seal 58 becomes disengaged from the contiguous surface of valve cap 39. Adjusting bolt 35 is then screwed either into or out of threaded collar 34 so as to adjust float 30 to allow the desired level of water to be received by the drinking trench 11. If the composite drinker is to be suspended from the ceiling or the like, suspension rods 66 are inserted through openings 65 in connecting wall 18 and nuts 70 are secured on threaded portions 69. Nut 76 is screwed onto shaft 61 and cover 60 is moved into an adjacent position whereupon plate 75 is brought into contact with cover 60. Hooked ends 67 of suspension rods 66 are inserted through respective openings 64 in bearing plate 62 and are moved into a position adjacent plate 75. Nut 63 is threadably moved into a position of contact with bearing plate 62 and nut 76 is turned in the appropriate direction to tighten cover 60 against plate 75 and to sandwich ends 67 of suspension rods 66 between plates 62 and 75 to secure the whole of the same in that position.

Upon allowing water to enter water inlet 13 from a source, water flows through valve chamber 14, through opening 50 in valve cover 39 and dribbles into float receptacle 12 as shown in FIGURES 4 and 9. The water is maintained at a level in the drinking trench 11 which is substantially equal to the level in the float receptacle by passing from float receptacle 12 through channels 23 into drinking trench 11. As the level of the water in trough 10 becomes sufficient to buoy float 30, float 30 rises and lifts weight 36 out of contact with valve cap 39 whereupon spring 37 forces plunger 56 upwardly to bring valve seal 58 in contact with the interior wall of valve cap 39 so as to stop the flow of water through opening 50. As the water is consumed by the fowl from drinking trench 11, float 30 is lowered and weight 36 contacts plunger 56 and forces it downwardly against spring 37 whereby water is once again allowed to enter drinking trench 11 in the manner just described.

In reference to FIGURE 6, if a chicken perches on the composite drinker as shown, the drinker is tilted and the level of water in one side of drinking trench 11 and the adjacent portion of float receptacle 12 becomes greater than the level diametrically opposite therefrom. Since float 30 resides on the water in float receptacle 12, a shifting of the water level causes float 30 and the supporting structure to assume a new position relative the central axis of the drinker and the weight 36 to be shifted and disengaged from the top wall surface of cap 39. Since shaft 56 is slightly longer than the cylindrical length of opening 50, the tilting of weight 36 relative valve cap 39 causes plunger 56 to assume its normal closed position and valve seat 58 to reside against the inner wall surface of valve cap 39. Therefore, any substantial tilting of trough 10 will close opening 50 and shut off the supply of water to float receptacle 12. Thus, whether the drinker is suspended or supported, it will if tilted as by a chicken if suspended, or by being placed on an uneven surface, if supported, will automatically shut itself off. Of particular interest to manufacture of the drinker is the fact that an integral molded member provides the trench, the float receptacle, the valve chamber and water inlet.

While particular embodiments of the invention are illustrated and described, various modifications may obviously be made without departing from the scope and spirit of the invention therefore intended to be defined in the appended claims. For example, other forms of loosely mounted and laterally shiftable floats may be employed. Also, other means may be employed to provide the desired loosely engaging and shiftable bearing surface for opening and closing the valve pin in level and tilt conditions.

We claim:

1. An automatic poultry drinker for presenting a predetermined level of water to the watering fowl comprising:

(a) a receptacle having peripheral side and bottom walls for receiving and containing the water therein;

(b) a cover member adapted to be supported by said receptacle bottom wall and in combination with said bottom wall defining an exterior drinking trench and an interior water reservoir, said drinking trench and said water reservoir being in aquatic communication;

(c) a substantially flat float means being buoyed in said water reservoir by the water, said float means having a concentrically located opening;

(d) a plurality of float support means connected to said float means and extending upwardly and intersecting over said opening in said float means; and (e) valve means mounted on said receptacle bottom wall and being axially aligned with said opening in said float means, said valve means including valve walls forming a chamber and being connected to a water source, said valve walls defining a top wall having an opening therein, a plunger residing in said chamber having a body portion normally seating against said valve top wall to aquatically seal said top wall opening and having a shaft slidably residing in and extending through said top wall opening, associated with said valve means to normally maintain said plunger body portion against said top wall and weight means in communication with said float support means and said plunger shaft for breaking said aquatic seal between said top wall and said plunger body portion to cause water to flow from said valve chamber into said receptacle upon the lowering of the water level in said receptacle below said predetermined level and for allowing said plunger body portion to be reseated against said valve top wall upon the raising of the water level in said receptacle to said predetermined level.

2. The automatic poultry drinker of claim 1 wherein said weight means in communication with said float support means and said plunger shaft is adjustable whereby said predetermined level of water in said receptacle may be varied and wherein said means associated with said valve means is a spring means.

3. The automatic poultry drinker of claim 2 wherein said adjustable communicating means is comprised of a vertically extending threaded shaft being threadably received by said float support means at the intersection thereof and a plunger depressor secured to the lowered end of said threaded shaft, said plunger depressor being adapted to engage and depress said plunger shaft upon the lowering of the level of water below said predetermined level whereby the water is allowed to escape from said valve chamber, through said top wall opening and into said receptacle to raise the level of the water therein to said predetermined level whereupon said plunger depressor allows said plunger body position to be reseated against said valve top wall and aquatically seal top wall opening.

4. The automatic poultry drinker of claim 3 wherein said plunger depressor is weighted sufficiently heavy in combination with said float means and said float support means to overcome said spring means when the level of water in said receptacle is below said predetermined level.

5. The automatic poultry drinker of claim 1 wherein said receptacle bottom wall is provided with an upwardly extending connecting wall being in concentric arrangement with said peripheral side wall, said connecting wall in combination with said peripheral side wall forming said drinking trench and in combination with said bottom wall forming said interior water reservoir, said connecting wall having a least one opening to provide a common level of water in said drinking trench and said water reservoir and being adapted to receive and support said cover.

6. An automatic poultry drinker for presenting a predetermined level of water to the watering fowl comprising:
(a) a composite receptacle having a bottom wall, a peripheral side wall integrally connected to and extending upwardly from said bottom wall and an interior connecting wall supported by and extending upwardly from said bottom wall, said connecting wall and said side wall forming a drinking trench and said connecting wall and said bottom wall forming an interior water reservoir with said water reservoir being in aquatic communication with said drinking trench;
(b) a conical-shaped cover member having a base adapted to reside on and be supported by said connecting wall, said cover member being effective to enclose said interior water reservoir;
(c) a disc-shaped float being buoyed in said water reservoir by the water therein, said float having a concentrically located opening;
(d) a plurality of float supports connected to said float and extending upwardly and intersecting over said float opening, said float supports having a threaded hole formed in the intersection thereof; and
(e) a valve supported by said receptacle bottom wall and being axially aligned with said opening in said float and said threaded hole in said float supports, said valve including valve side, top and bottom walls forming a chamber, said bottom wall being connected to a water supply source and said top wall being provided with a valve opening being in axial alignment with said threaded hole in said float supports, a plunger residing in said chamber having a body portion normally seating against said valve top wall to aquatically seal said top wall opening and a shaft connected to said body portion and slidably residing in and extending through said top wall opening, a spring residing in said chamber and normally maintaining said plunger body portion against said top wall, a bolt having an enlarged head and a threaded shaft being secured at its upper end to said head, said threaded shaft being received by said threaded hole in said float supports to travel in the axial direction upon the turning of said enlarged head and a weight means constituting a plunger depressor securely attached to the lower end of said threaded shaft, said plunger depressor adapted to engage and force said plunger shaft downwardly to break said aquatic seal between said top wall and said plunger body portion to cause water to flow from said valve chamber into said receptacle upon the lowering of the water level in said receptacle below said predetermined level and adapted to allow said plunger body portion to be reseated against said valve top wall upon the raising of the water level in said receptacle to said predetermined level.

7. The automatic poultry drinker of claim 6 wherein said receptacle is supported by overhead means connected to a ceiling including a plurality of suspension rods being secured at their lower ends to said connecting wall, said suspension rods extending vertically above said receptacle in a converging relationship, a support plate receiving the upper ends of said suspension rods and a support cable connected to said ceiling at the upper end and to said plate at the lower end, said cover being placed over said suspension rods and said support plate with said cable extending axially through the same.

8. The automatic poultry drinker of claim 7 wherein said support plate is provided with a central opening through which said cable extends and a plurality of peripheral holes, said suspension rods having hook-shaped upper ends for extending over portions of said support plate and downwardly through said holes, said lower end of said cable being threaded and slidably receiving said cover and said support plate, a bearing plate slidably placed on said cable between said cover and said support plate and a pair of nuts threadably received by said threaded cable end with one of said nuts being positioned on top of said cover and the other of said nuts being positioned beneath said support plate whereby upon the respective tightening of said nuts, said cover is secured against said bearing plate and said suspension rod hook-shaped ends are sandwiched between said bearing and support plates.

9. The automatic poultry drinker of claim 6 wherein said bottom wall of said valve is a portion of said receptacle bottom wall and said valve side walls are integrally connected to said bottom wall, said valve top wall being detachably secured to said valve side walls.

10. The automatic poultry drinker of claim 6 wherein said weighted plunger depressor has a surface adapted to engage said plunger shaft being of an indented frustum shape, said indented shape including an outwardly extending mound adapted to engage said plunger shaft and wherein the exterior surface of said valve top wall is recessed to receive said mound, whereby upon the substantial tilting of said receptacle relative said float, said plunger depressor mound slides out of contact with said plunger shaft to allow said plunger body portion to aquatically seal said top wall opening.

11. An automatic circular type drinker for watering fowl or the like, comprising:
(a) an integral receptacle member including a plurality of walls defining an open top, substantially narrow, annular drinking trench on the outer periphery of the drinker, within and concentric with said trench defining a substantially wide annular water storage receptacle and including passageways communicating said trench and receptacle, and within and concentric with said receptacle defining a vertically oriented valve chamber having a water inlet connected thereto;
(b) a float member conforming to the shape of and loosely residing in said receptacle;

(c) weighted valve opening means secured to and supported by said float above said chamber;

(d) valve means mounted in said chamber and operative when closed to prevent water from leaving said chamber and when open to allow water to leave said chamber, to enter said receptacle and to flow to said trench, said float being effective to buoy said opening means and said valve upon closing being arranged to move against the force of said opening means and upon opening to move with the assistance of said opening means, the closing of said valve and the attaining of a predetermined level of water in said trench being dependent upon said valve opening means being moved upwardly to a predetermined position above said chamber; and (e) an integral cover member secured to said receptacle member and providing a cover over only the portion of said receptacle member embodying said receptacle whereby to leave said trench open.

12. A poultry drinker capable when in a normal level position of automatically maintaining a predetermined depth of drinking water and when tilted of shutting off the supply of such water, comprising:

(a) a pan shaped container having side and bottom walls defining an exterior drinking trench and an interior water reservoir and including a connecting passageway for maintaining water at the same level in each;

(b) a valve mounted in said bottom wall and connected to a water source and centrally positioned in said reservoir, said valve including a vertically positionable plunger means having an exposed upper end, said plunger means controlling when moved downwardly the opening and when moved upwardly the closing of said valve and being adapted to be normally closed;

(c) float means providing a buoyant structure surrounding said valve and loosely mounted to float in said reservoir; and (d) valve opening means comprising a weighted bearing member supported by said float means and having a bearing surface residing immediately adjacent the upper end of said plunger means, said bearing member and float means causing said surface to loosely engage said plunger means and exert a downward force thereon to open said valve when said float means moves downwardly upon water being depleted in said reservoir, to bring said surface out of active engagement with said plunger means sufficient to remove said downward force and allow said valve to close when said float means moves upwardly upon said reservoir being filled to said depth, and upon said drinker being tilted, to allow said float means and surface to move laterally sufficient to remove the said force from said plunger means to close said valve.

13. The drinker of claim 12 including adjusting means for adjusting the position of said bearing member with respect to said float means whereby to adjust said surface and thereby regulate said depth.

14. The drinker of claim 13 wherein said float means comprises a uniform annular flotation member surrounding said valve and said valve includes spring means tending to normally move said plunger means upwardly and maintain said plunger means and thus said valve in a closed position.

15. The drinker of claim 14 wherein said bearing member includes a weight portion above said surface and the downward force of said weight portion constantly tends to opposite the buoyant force of said float means and to move said surface downwardly and in engagement with said plunger means to open said valve.

References Cited
UNITED STATES PATENTS

| | | | |
|---|---|---|---|
| 1,982,062 | 11/1934 | Matthews | 137—104 |
| 2,097,719 | 11/1937 | Brembeck | 119—80 |
| 2,628,631 | 2/1953 | Boyd | 137—430 |
| 2,662,503 | 12/1953 | Johnson | 119—80 |
| 2,821,167 | 1/1958 | Gilbertson | 119—80 X |
| 3,286,724 | 11/1966 | Sawyer | 119—78 X |

ALDRICH F. MEDBERY, Primary Examiner.

U.S. Cl. X.R.

137—426, 430, 437